United States Patent [19]

Yamamura et al.

[11] Patent Number: 4,614,690

[45] Date of Patent: Sep. 30, 1986

[54] INORGANIC FIBER-REINFORCED METALLIC COMPOSITE MATERIAL

[75] Inventors: Takemi Yamamura; Masahiro Tokuse; Yoshiharu Waku, all of Ube, Japan

[73] Assignee: UBE Industries, Ltd., Ube, Japan

[21] Appl. No.: 723,891

[22] Filed: Apr. 16, 1985

[30] Foreign Application Priority Data

Apr. 20, 1984 [JP] Japan .................................. 59-78389

[51] Int. Cl.$^4$ ............................................ B32B 15/14
[52] U.S. Cl. .................................... 428/614; 428/608; 428/610
[58] Field of Search ......................... 428/614, 610, 608

[56] References Cited

U.S. PATENT DOCUMENTS

| | | | |
|---|---|---|---|
| 3,352,650 | 11/1967 | Goldstein et al. | 428/614 |
| 3,691,623 | 9/1972 | Staudhammer et al. | 428/614 |
| 3,838,983 | 10/1974 | Brown et al. | 428/608 |
| 3,888,661 | 6/1975 | Levitt et al. | 428/608 |
| 3,890,690 | 6/1975 | Li | 428/614 |
| 3,895,162 | 7/1975 | Lemont et al. | 428/608 |
| 3,912,462 | 10/1975 | Balthis et al. | 428/608 |
| 3,918,141 | 11/1975 | Pepper et al. | 428/608 |
| 3,970,136 | 7/1976 | Cannell et al. | 428/614 |
| 4,010,004 | 3/1977 | Brown et al. | 428/608 |
| 4,134,759 | 1/1979 | Yajima et al. | 428/608 |
| 4,145,471 | 3/1979 | Kendall et al. | 428/614 |
| 4,226,917 | 10/1980 | Tsuroka et al. | 428/614 |
| 4,265,982 | 5/1981 | McCreary et al. | 428/608 |

FOREIGN PATENT DOCUMENTS 54-16312  6/1979  Japan .................................. 428/614

Primary Examiner—Veronica O'Keefe
Attorney, Agent, or Firm—Ladas & Parry

[57] ABSTRACT

An inorganic fiber-reinforced metallic composite material comprising a matrix of a metal or its alloy and inorganic fibers as a reinforcing material, characterized in that (a) the inorganic fibers are inorganic fibers containing silicon, either titanium or zirconium, carbon and oxygen and being composed of
  (i) an amorphous material consisting substantially of Si, M, C and O, or
  (ii) an aggregate consisting substantially of ultrafine crystalline particles with a particle diameter of not more than 500 Å of β-SiC, MC, a solid solution of β-SiC and MC and $MC_{1-x}$, and amorphous $SiO_2$ and $MO_2$, provided that in the above formulae, M represents titanium or zirconium, and x is a number represented by $0 < x < 1$, or
  (iii) a mixture of the amorphous material (i) and the aggregate (ii),
(b) the inorganic fibers have an initial degradation speed of not more than about 0.3 kg/mm$^2$.sec$^{-1}$ and a tenacity reduction ratio of not more than about 30% during the production of the composite material,
(c) the composite material has a short beam shear strength, measured in the monoaxially reinforced state, of at least about 8 kg/mm$^2$,
(d) the composite material has a transverse tensile strength, measured in the monoaxially reinforced state, of at least about 6 kg/mm$^2$, and
(e) the composite material has a fatigue limit/tensile strength ratio of at least about 0.4.

13 Claims, 2 Drawing Figures

Fig. 1-A
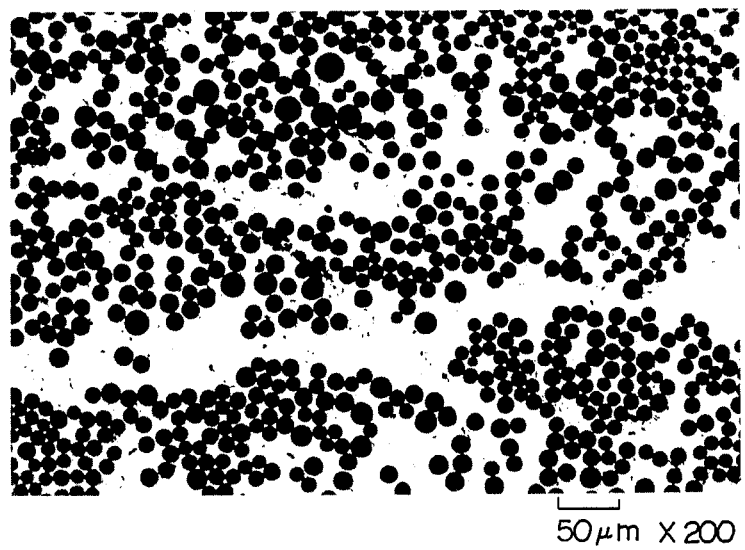
50μm ×200
Fig. 1-B
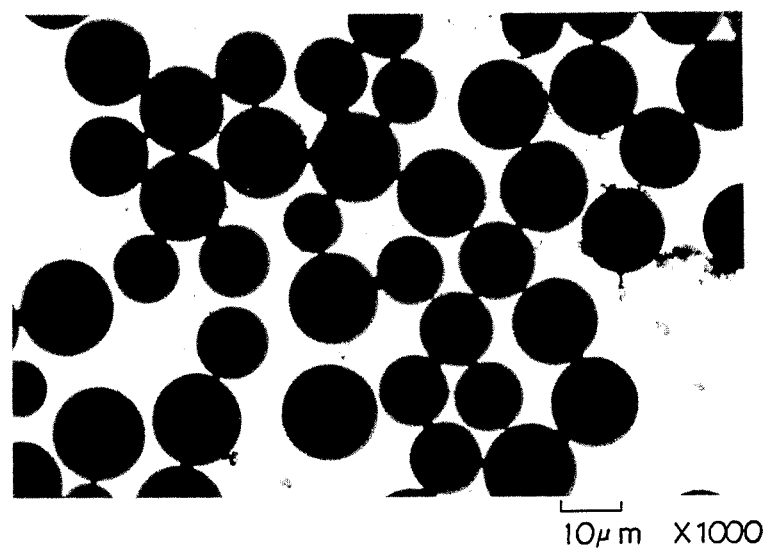
10μm ×1000

INORGANIC FIBER-REINFORCED METALLIC COMPOSITE MATERIAL

BACKGROUND OF THE INVENTION

This invention relates to an inorganic fiber-reinforced metallic composite material (to be abbreviated as a composite material) having excellent mechanical properties and comprising a matrix of a metal or its alloy (to be inclusively referred to as a metal) and inorganic fibers composed mainly of silicon, either titanium or zirconium, carbon and oxygen as a reinforcing material.

Some patent documents including Japanese Laid-Open Patent Publications Nos. 7811/1977, 24111/1977, 30407/1978 and 26305/1977 disclose that non-surface-treated silicon carbide fibers obtained by spinning organic silicon polymers called polycarbosilanes, rendering the fibers infusible and calcining the infusible fibers show excellent mechanical strength when used as reinforcing fibers for metals such as aluminum, magnesium and titanium. However, when these silicon carbide fibers are immersed in a molten bath of a metal such as aluminum, their strength is reduced markedly as shown in Referential Example given hereinafter, and the strength of a composite material composed of a matrix of aluminum and the reinforcing silicon carbide fibers is much lower than its theoretical strength calculated from the strength and volumetric proportion of the fibers.

SUMMARY OF THE INVENTION

It is an object of this invention to provide a composite material of excellent mechanical properties which offers a solution to the aforesaid problem of the prior art.

Another object of this invention is to provide a composite material comprising a matrix of a metal and inorganic fibers, which are bonded to each other with excellent strength.

Still another object of this invention is to provide a composite material comprising a matrix of a metal and inorganic fibers which shows excellent compatibility between the components and an excellent reinforcing efficiency by the inorganic fibers.

Yet another object of this invention is to provide a composite material comprising a matrix of a metal and inorganic fibers which can be produced without a reduction in the tenacity of the inorganic fibers.

An additional object of this invention is to provide a composite material which lends itself to mass production.

According to this invention, there is provided an inorganic fiber-reinforced metallic composite material comprising a matrix of a metal or its alloy and inorganic fibers as a reinforcing material, characterized in that (a) the inorganic fibers are inorganic fibers containing silicon, either titanium or zirconium, carbon and oxygen and being composed of (i) an amorphous material consisting substantially of Si, M, C and O, or (ii) an aggregate consisting substantially of ultrafine crystalline particles with a particle diameter of not more than 500 Å of $\beta$-SiC, MC, a solid solution of $\beta$-SiC and MC and $MC_{1-x}$, and amorphous $SiO_2$ and $MO_2$, provided that in the above formulae, M represents titanium or zirconium, and x is a number represented by $0<x<1$, or (iii) a mixture of the amorphous material (i) and the aggregate (ii), (b) the inorganic fibers have an initial degradation speed of not more than about 0.3 $kg/mm^2.sec^{-1}$ and a tenacity reduction ratio of not more than about 30% during the production of the composite material, (c) the composite material has a short beam shear strength of at least about 8 $kg/mm^2$, (d) the composite material has a transverse tensile strength of at least about 6 $kg/mm^2$, and (e) the composite material has a fatigue limit/tensile strength ratio of at least about 0.4.

BRIEF DESCRIPTION OF THE DRAWINGS

FIGS. 1-A and 1-B are scanning electron microphotographs of the inorganic fibers (I) in accordance with this invention in a cross section taken of a composite material composed of an aluminum matrix and the inorganic fibers (I).

DETAILED DESCRIPTION OF THE INVENTION

The inorganic fibers used in this invention are described in European Patents Nos. 30145 and 37249, and can be produced by the following methods.

Inorganic fibers consisting substantially of Si, Ti, C and O or of Si, Zr, C and O can be produced by a method which comprises:

a first step of mixing (1) a polycarbosilane having a number average molecular weight of about 500 to 10,000 and a main-chain skeleton composed mainly of structural units of the formula $+Si-CH_2+$ in which the silicon atom substantially has two side-chain groups selected from the class consisting of hydrogen atoms, lower alkyl groups and phenyl groups with (2) a polymetallosiloxane having a number average molecular weight of about 500 to 10,000 and a main-chain skeleton composed of metalloxane units of the formula $+M-O+$ wherein M represents Ti or Zr and siloxane units of the formula $+Si-O+$, the ratio of the total number of the metalloxane units to that of the siloxane units being in the range of from 30:1 to 1:30, most of the silicon atoms of the siloxane units having 1 or 2 side-chain groups selected from the class consisting of lower alkyl and phenyl groups and most of the metal atoms of the metalloxane units having 1 or 2 lower alkoxy groups as side-chain groups, in such a mixing ratio that the ratio of the total number of the $+Si-CH_2+$ structural units of the polycarbosilane to the total number of the $+M-O+$ units and the $+M-O+$ units and the $+Si-O+$ units is in the range of from 100:1 to 1:100, and heating the resulting mixture in an organic solvent in an atmosphere inert to the reaction to bond at least some of the silicon atoms of the polycarbosilane to at least some of the silicon atoms and/or metal atoms of the polymetallosiloxane through oxygen atoms and thereby form an organic metal polymer having a number average molecular weight of about 1000 to 50,000 and composed of a crosslinked polycarbosilane moiety and polymetallosiloxane moiety;

a second step of preparing a spinning dope of the resulting polymer and spinning it;

a third step of rendering the spun fibers infusible under tension or under no tension; and a fourth step of calcining the infusible fibers in vacuum or in an atmosphere of an inert gas at a temperature in the range of 800° to 1800° C.

Alternatively, the inorganic fibers consisting substantially of Si, Ti, C and O or of Si, Zr, C and O can be produced by a process which comprises:

a first step of mixing a polycarbosilane having a number average molecular weight of 200 to 10,000 and mainly containing a main-chain skeleton represented by the general formula

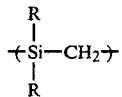

wherein R represents a hydrogen atom, a lower alkyl group or a phenyl group, and an organic metal compound represented by the general formula $$MX_4$$

wherein M represents Ti or Zr and X represents an alkoxy group containing 1 to 20 carbon atoms, a phenoxy group, or an acetylacetoxy group, in such mixing ratios that the ratio of the total number of the structural units of the formula $+Si-CH_2+$ to the total number of the structural units of the formula $+M-O+$ of the organic metal compound is in the range of from 2:1 to 200:1, and reacting the mixture under heat in an atmosphere inert to the reaction to bond at least some of the silicon atoms of the polycarbosilane to the metal atoms of the organic metal compound through oxygen atoms and form an organic metallic polymer having a number average molecular weight of about 700 to 100,000;

a second step of preparing a spinning dope of the organic metal polymer and spinning it;

a third step of rendering the spun fibers insoluble under tension or under no tension; and a fourth step of calcining the infusible fibers at a temperature of 800° to 1800° C. in vacuum or in an atmosphere of an inert gas.

The inorganic fibers contain 30 to 60% by weight of Si, 0.5 to 35% by weight, preferably 1 to 10% by weight, of Ti or Zr, 25 to 40% by weight of C, and 0.01 to 30% by weight of O.

The inorganic fibers may be used in various forms, for example in the form of a blend of these fibers arranged monoaxially or multiaxially, a woven fabric such as a fabric of the plain, satin, imitation gauze, twill or leno weave or a helically or three-dimensionally woven fabric, or chopped strands.

Examples of the metal which can be used in the composite material of this invention are aluminum, aluminum alloys, magnesium, magnesium alloys, titanium and titanium alloys.

The proportion of the inorganic fibers to be mixed with the matrix is preferably 10 to 70% by volume.

The metallic composite material of this invention may be produced by ordinary methods for producing fiber-reinforced metallic composites, for example by (1) a diffusion bonding method, (2) a melting-penetration method, (3) a flame spraying method, (4) an electrodeposition method, (5) an extrusion and hot roll method, (6) a chemical vapor deposition method, and (7) a sintering method. These methods will be more specifically described below.

(1) According to the diffusion bonding method, the composite material can be produced by arranging the inorganic fibers and metal wires as the matrix alternately in one direction, covering both surfaces of the resulting assembly with thin films of the matrix metal or covering its under surface with a thin film of the matrix metal and its upper surface with a powder of the matrix metal mixed with an organic binder to form a composite layer, stacking several such layers, and thereafter consolidating the stacked layers under heat and pressure. The organic binder is desirably one which volatilizes before it is heated to a temperature at which it forms a carbide with the matrix metal. For example, CMC, paraffin, resins, and mineral oils are preferably used. Alternatively, the composite material may be produced by applying a powder of the matrix metal mixed with the organic binder to the surface of a mass of the inorganic fibers, stacking a plurality of such assemblies, and consolidating the stacked assemblies under heat and pressure.

(2) According to the melting-penetration method, the composite material may be produced by filling the interstices of arranged inorganic fibers with a molten mass of aluminum, an aluminum alloy, magnesium, a magnesium alloy, titanium or a titanium alloy. Since wetting between the fibers and the matrix metal is good, the interstices of the arranged fibers can be uniformly filled with the matrix metal.

(3) According to the flame spray method, the composite material can be produced in tape form by coating the matrix metal on the surface of arranged inorganic fibers by plasma spraying or gas spraying. It may be used as such, or if desired, a plurality of such tape-like composite materials are stacked and processed by the diffusion bonding method described in (1) above to produce a composite material.

(4) According to the electrodeposition method, the matrix metal is electrolytically deposited on the surface of the fibers to form a composite. A plurality of such composites are stacked and processed by the diffusion bonding method (1) to produce a composite material.

(5) According to the extrusion and hot roll method, the composite material can be produced by arranging the inorganic fibers in one direction, sandwiching the arranged fibers with foils of the matrix metal, and passing the sandwiched structure through optionally heated rolls to bond the fibers to the matrix metal.

(6) According to the chemical vapor deposition method, the composite material may be produced by introducing the inorganic fibers into a heating furnace, thermally decomposing them by introducing a gaseous mixture of, for example, aluminum chloride and hydrogen gas to deposit the aluminum metal on the surface of the fibers, stacking a plurality of such metal-deposited inorganic fiber masses, and processing them by the diffusion bonding method (1).

(7) According to the sintering method, the composite material can be produced by filling the interstices of arranged inorganic fibers with a powder of the matrix metal, and then sintering them under heat with or without pressure.

The tensile strength ($\sigma_c$) of the composite material produced from the inorganic fibers and the metal matrix is represented by the following formula.

$$\sigma_c = \sigma_f V_f + \sigma_M V_M$$

wherein
$\sigma_c$: the tensile strength of the composite material,
$\sigma_f$: the tensile strength of the inorganic fibers,
$\sigma_M$: the tensile strength of the matrix metal
$V_f$: the percent by volume of the inorganic fibers,
$V_M$: the percent by volume of the matrix metal.

As shown by the above formula, the strength of the composite material becomes larger as the volumetric proportion of the inorganic fibers in the composite material becomes larger. To produce a composite material having high strength, the volumetric proportion of the inorganic fibers should be increased. If, however, the volumetric proportion of the inorganic fibers exceeds 70%, the amount of the metal matrix becomes smaller and it is impossible to file the interstices of the inorganic fibers fully with the matrix metal. The resulting composite material fails to exhibit the strength represented by the above formula. If, on the other hand, the amount of the fibers is decreased, the strength of the composite material represented by the above formula is reduced. To obtain composite materials of practical use, it is necessary to incorporate at least 10% of the inorganic fibers. Accordingly, the best results can be obtained in the production of the inorganic fiber-reinforced metallic composite of this invention when the volumetric proportion of the inorganic fibers to be incorporated is adjusted to 10 to 70%.

In the production of the composite material, it is necessary to heat the metal to a temperature to near or above the melting temperature and consolidate it with the inorganic fibers. At such temperatures, the metal reacts with the inorganic fibers to reduce the strength of the fibers, and the desired tensile srength ($\sigma_c$) of the composite cannot be fully obtained.

In contrast, when the inorganic fibers used in this invention are immersed in a molten bath of the matrix metal, no such abrupt degradation of the inorganic fibers as in ordinary silicon carbide fibers is observed.

The composite material of this invention should have a short beam shear strength of at least 8 kg/mm$^2$, a transverse tensile strength of at least about 6 kg/mm$^2$ and a fatigue limit/tensile strength ratio of at least about 0.4. The inorganic fibers in the composite material during its formation should have an initial reaction degradation speed of not more than about 0.3 kg/mm$^2$.sec$^{-1}$, and a tenacity reduction ratio of not more than about 30%.

Preferred mechanical properties of the composite material of this invention differ depending upon the type of the matrix metal, and may be exemplified as follows:

| Matrix metal | Shortbbeam Shear strength (kg/mm$^2$) | Transverse tensile strength (kg/mm$^2$) |
| --- | --- | --- |
| Aluminum | at least about 8 | at least about 6 |
| Aluminum alloy | at least about 13 | at least about 12 |
| Magnesium | at least about 8 | at least about 6 |
| Magnesium alloy | at least about 9 | at least about 8 |
| Titanium | at least about 20 | at least about 17 |
| Titanium alloy | at least about 32 | at least about 27 |

The various mechanical properties, as used herein, are measured by the following methods.

(a) Initial degradation speed (1) When a metal or its alloy having a melting point of not more than 1200° C. is used:

The inorganic fibers are immersed for 1, 5, 10, and 30 minutes respectively in a molten metal heated to a temperature 50° C. higher than its melting point. The fibers are then withdrawn and their tensile strength is measured. The relation between the immersion time and the tensile strength of the fibers (degradation curve) was determined, and the initial degradation speed (kg/mm$^2$.sec$^{-1}$) is determined from the tangential line at an immersion time of 0.

(2) When a metal or its alloy having a melting point higher than 1200° C. is used:

The inorganic fibers and a foil of the metal are stacked, and the assembly is heated in vacuum to a temperature corresponding to the melting point of the metal foil multiplied by (0.6–0.7), and maintained under a pressure of 5 kg/mm$^2$ for a period of 5, 10, 20 and 30 minutes, respectively. The fibers are then separated, and their tensile strength is measured. From the result of the measurement, the initial degradation speed is determined by the same procedure as in (1) above.

The initial reaction degradation speed shows the degree of the reaction of the fibers with the matrix metal when a fiber reinforced metal is to be produced within a short period of time. The smaller this value, the better the compatibllity between the fibers and the matrix and the greater the effect of reinforcing by the fibers.

(b) Fiber tenacity reduction ratio

The tenacity of the fibers is measured at an immersion time of 30 minutes and a maintenance time of 30 minutes in (a) above, and subtracted from the tenacity of the fibers before immersion or maintenance (initial tenacity). The balance is divided by the initial tenacity, and defined as the fiber tenacity reduction ratio.

The tenacity reduction ratio shows the degree of the reaction between the fibers and the matrix when a fiber reinforced metal is to be produced over a long period of time. The smaller this value, the better the compatibility between the fibers and the matrix and the greater the effect of reinforcing by the fibers.

(c) Short beam shear test

This test is designed to measure shear stress between layers. A sample of the composite material (10×12×2 mm) in which the inorganic fibers are monoaxially oriented is placed on two pins having a radius of curvature of 6 mm and a length of 20 mm and compressed by a pressing member having a tip radius of curvature of 3.5 mm. The test is carried out by the so-called 3-point bending method, and the shear stress between the layers is measured and expressed in kg/mm$^2$.

(d) Transverse tensile strength

A monoaxially fiber-reinforced composite material having a thickness of 2 mm is produced, and a test sample is prepared from it so that the axial direction of the test sample crosses the fiber arranging direction at right angles. The thickness of the test sample is 2 mm. A curvature of 125 mmR is provided centrally in the thickness direction in the sample and the central portion is finished to a thickness of about 1 mm. The tensile speed is 1 mm/min. The result is expressed as tensile strength in kg/mm$^2$.

The short beam shear strength and transverse tensile strength are indices which represent the strength of bonding between the matrix and the fibers.

(e) Fatigue test

A rotating bending fatigue test with a capacity of 1.5 kgm is carried out. The fatigue strength in the 10$^7$th cycle is measured and defined as the fatigue limit. The fatigue limit is an index for safety design of the mechanical structure of the composite material in use.

Since the inorganic fiber-reinforced material of this invention has excellent mechanical properties such as tensile strength, high moduli of elasticity, and excellent heat resistance and abrasion resistance, it is useful as synthetic fibrous materials, materials for synthetic chemistry, materials for mechanical industry, materials for construction machinery, materials for marine and space exploitation, automotive materials, food packing and storing materials, etc.

Production of inorganic fibers (I)

Three parts by weight of polyborosiloxane is added to 100 parts by weight of polydimethylsilane synthesized by dechlorinating condensation of dimethyldichlorosilane with metallic sodium. The mixture was subjected to thermal condensation at 350° C. in nitrogen to obtain polycarbosilane having a main-chain skeleton composed mainly of carbosilane units of the formula $+Si-CH_2+$ and containing a hydrogen atom and a methyl group attached to the silicon atom of the carbosilane units. A titanium alkoxide is added to the resulting polycarbosilane, and the mixture is subjected to crosslinking polymerization at 340° C. in nitrogen to obtain polytitanocarbosilane composed of 100 parts of the carbosilane units and 10 parts of titanoxane units of the formula $+Ti-O+$. The polymer is melt-spun, and treated in air at 190° C. to render the fibers infusible. Subsequently, the fibers are calcined in nitrogen at 1300° C. to obtain inorganic fibers (I) consisting mainly of silicon, titanium (3% by weight), carbon and oxygen and having a diameter of 13 microns, a tensile strength of 310 kg/mm$^2$ and a modulus of elasticity of 16 tons/mm$^2$. The resulting inorganic fibers are composed of a mixture of an amorphous material consisting of Si, Ti, C and O and an aggregate of ultrafine crystalline particles with a particle diameter of about 50 Å of β-SiC, TiC, a solid solution of β-SiC and TiC and TiC$_{1-x}$ ($0<x<1$) and amorphous SiO$_2$ and TiO$_2$. The inorganic fibers contain 45% by weight of Si, 3.0% by weight of Ti, 25.4% by weight of C and 24.7% by weight of O.

Production of inorganic fibers (II)

Tetrakis-acetylacetonato zirconium is added to the polycarbosilane obtained as described above, and the mixture is subjected to crosslinking polymerization at 350° C. in nitrogen to obtain polyzirconocarbosilane composed of 100 parts of carbosilane units and 30 parts of zirconoxane units of the formula $+Zr-O+$. The polymer is dissolved in benzene and dry-spun, and treated in air at 170° C. to render the fibers infusible. Subsequently, the fibers are calcined at 1200° C. in nitrogen to obtain inorganic fibers (II) consisting mainly of silicon, zirconium, carbon and oxygen with 4.5% by weight of amorphous zirconium element and having a diameter of 10 microns, a tensile strength of 350 kg/mm$^2$, and a modulus of elasticity of 18 tons/mm$^2$. The inorganic fibers contain 46.4% by weight of Si, 66.0% by weight of Zr, 30.4% by weight of C and 15.2% by weight of O.

REFERENTIAL EXAMPLE

The inorganic fibers (I) used in this invention and silicon carbide fibers obtained from polycarbosilane alone and having a diameter of 13 microns, a tensile strength of 300 kg/mm$^2$ and a modulus of elasticity of 16 tons/mm$^2$ were each immersed for 30 minutes in a molten bath of pure aluminum (1070) at 670° C., and the reductions in tenacity of the two fibers were compared.

The inorganic fibers (I) showed a tenacity reduction ratio of 15%, while the silicon carbide fibers showed a tenacity reduction ratio of as high as 70%. It was therefore apparent that the inorganic fibers (I) have excellent compatibility with the matrix aluminum.

EXAMPLE 1

The inorganic fibers (II) were arranged monoaxially on a foil of pure aluminum (1070) having a thickness of 0.5 mm, and the same aluminum foil was put over the fibers. The assembly was then passed through hot rolls kept at 670° C. to form a composite. Twenty-seven such composites were stacked and left to stand in vacuum at 670° C. for 10 minutes and then hot-pressed at 600° C. An aluminum composite material reinforced with the inorganic fibers composed mainly of silicon, titanium, carbon and oxygen was thus produced. The content of the fibers in the composite material was 30% by volume. Scanning electron microphotographs of a cross section taken of the resulting composite material is shown in FIG. 1. FIG. 1 shows that aluminum and the inorganic fibers were very well combined with each other. The resulting composite material had a tensile strength of 74 kg/mm$^2$ and a modulus of elasticity of 8300 kg/mm$^2$.

COMPARATIVE EXAMPLE 1

A silicon carbide fiber-reinforced composite material was produced in the same way as in Example 1 except that silicon carbide fibers obtained from polycarbosilane alone were used instead of the inorganic fibers (I). The resulting composite material had a fiber content of 30% by volume, a tensile strength of 37 kg/mm$^2$ and a modulus of elasticity of 6300 kg/mm$^2$, thus showing much lower strength than the composite material of this invention obtained in Example 1. This is because the strength of the silicon carbide fibers decreased to 30% of their original strength upon immersion in molten aluminum at 670° C. for 10 minutes.

COMPARATIVE EXAMPLE 2

A carbon fiber-reinforced material was produced in the same way as in Example 1 except that carbon fibers were used instead of the inorganic fibers (I). The composite material had a fiber content of 30% by volume, and a tensile strength of 25 kg/mm$^2$, showing much lower strength than the composite material of this invention obtained in Example 1.

The initial degradation speeds, fiber tenacity reduction ratios, short beam shear strengths (SBSS), transverse tensile strengths (TTS) and fatigue limit/tensile strength ratios of the aluminum composite materials obtained above are summarized in Table 1.

TABLE 1

| Properties | Inorganic fibers (I) (invention) | SiC fibers (comparison) | Carbon fibers (comparison) |
|---|---|---|---|
| Initial degradation speed (kg/mm$^2$·sec$^{-1}$) | 0.07 | 1.2 | 3.2 |
| Fiber tenacity reduction ratio (%) | 15 | 70 | 90 |
| SBSS (kg/mm$^2$) | 8 | 4.4 | 2.2 |
| TTS (kg/mm$^2$) | 6 | 3.5 | 1.8 |
| Fatigue limit/tensile strength | 0.45 | 0.3 | 0.25 |

The results given in Table 1 demonstrate the superiority of the inorganic fiber-reinforced composite material of this invention to the other fiber-reinforced composite materials.

EXAMPLE 2

The inorganic fibers (II) were arranged monoaxially on a foil of aluminum alloy (6061) having a thickness of 0.5 mm, and the same aluminum foil was put over the fibers. The assembly was then passed through hot rolls kept at 670° C. to form a composite. Twenty-seven such composite foils were stacked and left to stand in vacuum at 670° C. for 10 minutes and then hot-pressed at 600° C. An aluminum composite material reinforced with inorganic fibers composed mainly of silicon, titanium, carbon and oxygen was produced. The content of the fibers in the composite material was 30% by volume.

COMPARATIVE EXAMPLE 3

A silicon carbide fiber-reinforced composite material was produced in the same way as in Example 2 except that silicon carbide fibers obtained from polycarbosilane alone were used instead of the inorganic fibers (I) used in this invention. The proportion of the fibers in this composite material was 30% by volume.

The initial degradation speeds, fiber tenacity reduction ratios, short beam shear strengths (SBSS), transverse tensile strengths (TTS) and fatigue limit/tensile strength ratios of the aluminum composite materials obtained above are summarized in Table 2.

TABLE 2

| Properties | Inorganic fibers (I) (invention) | SiC fibers (comparison) |
|---|---|---|
| Initial degradation speed (kg/mm$^2$ · sec$^{-1}$) | 0.12 | 1.4 |
| Fiber tenacity reduction ratio (%) | 20 | 75 |
| SBSS (kg/mm$^2$) | 13 | 8.7 |
| TTS (kg/mm$^2$) | 12 | 7 |
| Fatigue limit/ tensile strength | 0.42 | 0.32 |

The results given in Table 2 demonstrate the superiority of the inorganic fiber-reinforced composite material of this invention to the other fiber-reinforced composite material.

EXAMPLE 3

The inorganic fibers (II) were aligned monoaxially, and titanium metal was coated on the aligned fibers to a thickness of 0.1 to 10 microns by using a plasma spraying device. The coated fibers were stacked, and the interstices were filled with a powder of titanium metal. The assembly was compression molded, pre-calcined at 520° C. for 3 hours in an atmosphere of hydrogen gas and further hot-pressed for 3 hours at 1150° C. in an argon atmosphere while applying a pressure of 200 kg/cm$^2$ to obtain a titanium composite material reinforced with the inorganic fibers composed mainly of silicon, zirconium, carbon and oxygen. The proportion of the inorganic fibers in the composite material was 45% by volume. The composite material had a tensile strength of 160 kg/mm$^2$ which was about 2.7 times as high as the strength of titaniium itself.

COMPARATIVE EXAMPLE 4

A silicon carbide fiber-reinforced titanium composite material was produced in the same way as in Example 3 except that the silicon carbide fibers obtained from polycarbosilane alone were used instead of the inorganic fibers (II). The resulting composite material had a strength of 85 kg/mm$^2$ which as inferior to that of the composite material obtained in Example 3.

The initial degradation speeds, fiber tenacity reduction ratios, short beam shear strengths (SBSS), transverse tensile strengths (TTS) and fatigue limit/ tensile strength ratios of the aluminum composite materials obtained above are summarized in Table 3.

TABLE 3

| Properties | Inorganic fibers (I) (invention) | SiC fibers (comparison) |
|---|---|---|
| Initial degradation speed (kg/mm$^2$ · sec$^{-1}$) | 0.03 | 1.4 |
| Fiber tenacity reduction ratio (%) | 10 | 77 |
| SBSS (kg/mm$^2$) | 20.0 | 9.5 |
| TTS (kg/mm$^2$) | 17.0 | 7.6 |
| Fatigue limit/ tensile strength | 0.42 | 0.25 |

The results given in Table 3 demonstrate the superiority of the inorganic fiber-reinforced composite material of this invention to the other fiber-reinforced composite material.

EXAMPLE 4

The inorganic fibers (II) were aligned monoaxially, and a titanium alloy (Ti-6Al-4V) was coated on the aligned fibers to a thickness of 0.1 to 10 microns by using a plasma spraying device. The coated fibers were stacked, and the interstices were filled with a powder of the titanium alloy. The assembly was compression molded, pre-calcined at 520° C. for 3 hours in an atmosphere of hydrogen gas and further hot-pressed for 3 hours at 1150° C. in an argon atmosphere while applying a pressure of 200 kg/cm$^2$ to obtain a titanium alloy composite material reinforced with the inorganic fibers composed mainly of silicon, zirconium, carbon and oxygen. The proportion of the inorganic fibers in the composite material was 45% by volume.

COMPARATIVE EXAMPLE 5

A silicon carbide fiber-reinforced titanium alloy composite material was produced in the same way as in Example 4 except that silicon carbide fibers obtained from polycarbosilane alone were used instead of the inorganic fibers (II).

The initial degradation speeds, fiber tenacity reduction ratios, short beam shear strengths (SBSS), transverse tensile strengths (TTS) and fatigue limit/tensile strength ratios of the aluminum composite materials obtained above are summarized in Table 4.

TABLE 4

| Properties | Inorganic fibers (I) (invention) | SiC fibers (comparison) |
|---|---|---|
| Initial degradation speed (kg/mm$^2$ · sec$^{-1}$) | 0.035 | 1.5 |
| Fiber tenacity reduction ratio (%) | 12 | 80 |
| SBSS (kg/mm$^2$) | 32.0 | 15 |
| TTS (kg/mm$^2$) | 27.0 | 12 |
| Fatigue limit/ tensile strength | 0.40 | 0.25 |

The results given in Table 4 demonstrate the superiority of the inorganic fiber-reinforced composite material of this invention to the other fiber-reinforced composite material.

EXAMPLE 5

The inorganic fibers (II) were arranged monoaxially on a foil of pure magnesium having a thickness of 0.5 mm, and the same magnesium foil was put over the fibers. The assembly was then passed through hot rolls kept at 670° C. to form a composite. Twenty-seven such composites were stacked and left to stand in an argon atmosphere at 670° C. for 10 minutes and then hot-pressed at 600° C. A magnesium composite material reinforced with the inorganic fibers composed mainly of silicon, titanium, carbon and oxygen was produced. The content of the fibers in the composite material was 30% by volume.

COMPARATIVE EXAMPLE 6

A silicon carbide fiber-reinforced magnesium composite material was produced in the same way as in Example 5 except that silicon carbide fibers obtained from polycarbosilane alone were used instead of the inorganic fibers (II) used in Example 5.

The initial degradation speeds, fiber tenacity reduction ratios, short beam shear strengths (SBSS), transverse tensile strengths (TTS) and fatigue limit/tensile strength ratios of the aluminum composite materials obtained above are summarized in Table 5.

TABLE 5

| Properties | Inorganic fibers (I) (invention) | SiC fibers (comparison) |
|---|---|---|
| Initial degradation speed (kg/mm$^2$ · sec$^{-1}$) | 0.08 | 1.6 |
| Fiber tenacity reduction ratio (%) | 27 | 90 |
| SBSS (kg/mm$^2$) | 8.0 | 3.0 |
| TTS (kg/mm$^2$) | 6.0 | 2.4 |
| Fatigue limit/ tensile strength | 0.40 | 0.27 |

The results given in Table 5 demonstrate the superiority of the inorganic fiber-reinforced composite material of this invention to the other fiber-reinforced composite material.

EXAMPLE 6

The inorganic fibers (II) were arranged monoaxially on a foil of a magnesium alloy (AZ91) having a thickness of 0.5 mm, and the same magnesium alloy foil was put over the fibers. The assembly was then passed through hot rolls kept at 670° C. to form a composite. Twenty-seven such composites were stacked and left to stand in an argon atmosphere at 670° C. for 10 minutes and then hot-pressed at 600° C. A magnesium composite material reinforced with the inorganic fibers composed mainly of silicon, titanium, carbon and oxygen was produced. The content of the fibers in the composite material was 30% by volume.

COMPARATIVE EXAMPLE 7

A silicon carbide fiber-reinforced magnesium composite material was produced in the same way as in Example 6 except that silicon carbide fibers obtained from polycarbosilane alone were used instead of the inorganic fibers (II) used in Example 6.

The initial degradation speeds, fiber tenacity reduction ratios, short beam shear strengths (SBSS), transverse tensile strengths (TTS) and fatigue limit/tensile strength ratios of the aluminum composite materials obtained above are summarized in Table 6.

TABLE 6

| Properties | Inorganic fibers (I) (invention) | SiC fibers (comparison) |
|---|---|---|
| Initial degradation speed (kg/mm$^2$ · sec$^{-1}$) | 0.25 | 1.5 |
| Fiber tenacity reduction ratio (%) | 25 | 85 |
| SBSS (kg/mm$^2$) | 9.0 | 5.9 |
| TTS (kg/mm$^2$) | 8.0 | 4.7 |
| Fatigue limit/ tensile strength | 0.42 | 0.30 |

The results given in Table 6 demonstrate the superiority of the inorganic fiber-reinforced composite material of this invention to the other fiber-reinforced composite material.

EXAMPLE 7

The inorganic fibers (II) were woven into a plain-weave fabric (6 warps×6 wefts per cm; one yarn consisted of 500 fibers). Titanium metal was coated to a thickness of 0.1 to 10 microns on the resulting fabric by a plasma spraying device. A plurality of coated plain-weave fabrics were then stacked, and the interstices of the stacked fabric were filled with a powder of the titanium metal, and the assembly was compression-molded in a hydrogen gas atmosphere, pre-calcined at 520° C. for 3 hours, and hot pressed for 3 hours in an argon atmosphere at 1150° C. while applying a pressure of 200 kg/cm$^2$ to obtain a titanium composite material reinforced with the inorganic fibers composed mainly of silicon, zirconium, carbon and oxygen. The composite material had a tensile strength of 100 kg/mm$^2$ which was about 1.7 times as high as that of titanium metal.

COMPARATIVE EXAMPLE 8

A silicon carbide fiber-reinforced material wa produced in the same way as in Example 7 except that silicon carbide fibers obtained from polycarbosilane alone were used instead of the inorganic fibers (II). The strength of the composite material was 70 kg/mm$^2$, which was inferior to that of the composite material of this invention obtained in Example 7.

EXAMPLE 8

The inorganic fibers (I) cut into a length of 1 mm into a chopped form were added to a powder of a magnesium alloy composed of 3% of aluminum, 1% of manganese, 1.3% of zinc and the remainder being magnesium. They ere well mixed, and the mixture was packed into a stainless steel foil mold having a size of 70×50 ×10 mm, and maintained for 1 hour at 490° C. and a pressure of 200 kg/mm$^2$ in an atmosphere of argon. Finally, the stainlless steel foil was peeled off, and the product was surface-polished to obtain a magnesium alloy composite. The composite material contained 30% by volume of the inorganic fibers as chops, and had a tensile strength of 50 kg/cm$^2$.

COMPARATIVE EXAMPLE 9

A silicon carbide fiber-reinforced magnesium alloy composite material was produced in the same way as in Example 8 except that silicon carbide fibers obtained from polycarbosilane alone were used instead of the inorganic fibers (I). The resulting composite material had a tenacity of 30 kg/mm$^2$ which was inferior to the tenacity of the composite material obtained in Example 8.

What we claim is:

1. An inorganic fiber-reinforced metallic composite material comprising a matrix of a metal or its alloy and inorganic fibers as a reinforcing material, comprising
   (a) inorganic fibers of silicon, an element selected from the group consisting of titanium or zirconium, carbon and oxygen, said inorganic fibers being free of any surface coating, in the form of:
      (i) an amorphous material of Si, M, C and O, wherein M represents titanium or zirconium, or
      (ii) an aggregate of ultrafine crystalline particles with a particle diameter of not more than 500 Å of $\beta$-SiC, MC, a solid solution of $\beta$-SiC and MC and $MC_{1-x}$, and amorphous $SiO_2$ and $Mo_2$, wherein in the above formulae, M represents titanium or zirconium, and x is a number represented by $0<x<1$, or
      (iii) a mixture of the amorphous material (i) and the aggregate (ii), and
   (b) the metal selected from the group consisting of aluminum, magnesium or titanium, and the alloy is selected from the group consisting of an aluminum alloy, a magnesium alloy or a titanium alloy;
   said inorganic fibers having an initial degradation speed of not more than about 0.3 kg/mm$^2$.sec$^{-1}$ and a tenacity reduction ratio of not more than about 30% during the production of the composite material;
   said composite material having a short beam shear strength, measured in the monoaxially reinforced state, of at least about 8 kg/mm$^2$;
   said composite material having a transverse tensile strength, measured in the monoaxially reinforced state, of at least about 6 kg/mm$^2$ and
   said composite material having a fatigue limit/tensile strength ration of at least about 0.4.

2. The composite material of claim 1 wherein the matrix metal is aluminum, and the composite material has a short beam shear strength of at least about 8 kg/mm$^2$ and a transverse tensile strength of at least about 6 kg/mm$^2$, both measured in the monoaxially reinforced state.

3. The composite material of claim 1 wherein the matrix is an aluminum alloy, and the composite material has a short beam shear strength of at least about 13 kg/mm$^2$ and a transverse tensile strength of at least about 12 kg/mm$^2$, both measured in the monoaxially reinforced state.

4. The composite material of claim 1 wherein the matrix is magnesium, and the composite material has a short beam shear strength of at least about 8 kg/mm$^2$, and a transverse tensile strength of at least about 6 kg/mm$^2$, both measured in the monoaxially reinforced state.

5. The composite material of claim 1 wherein the matrix is a magnesium alloy and the composite material has a short beam shear strength of at least about 9 kg/mm$^2$ and a transverse tensile strength of at least about 8 kg/mm$^2$, both measured in the monoaxially reinforced state.

6. The composite material of claim 1 or wherein the matrix is titanium, and the composite material has a short beam shear strength of at least about 20 kg/mm$^2$ and a transverse tensile strength of at least about 17 kg/mm$^2$, both measured in the monoaxially reinforced state.

7. The composite material of claim 2 wherein the matrix is a titanium alloy, and the composite material has a short beam shear strength of at least about 32 kg/mm$^2$ and a transverse tensile strength of at least about 27 kg/mm$^2$, both measured in the monoaxially reinforced state.

8. The composite material of claim 1 wherein the inorganic fibers are oriented monoaxially.

9. The composite material of claim 1 wherein the inorganic fibers are oriented multiaxially.

10. The composite material of claim 1 wherein the inorganic fibers are in the form of a woven fabric of the plain, satin, imitation gauze, twill or leno weave.

11. The composite material of claim 1 wherein the inorganic fibers are in the form of a helically woven fabric or a three-dimensionally woven fabric.

12. The composite material of claim 1 wherein the inorganic fibers consist of 30 to 60% by weight of Si, 0.5 to 35% by weight of Ti or Zr, 25 to 40% by weight of C and 0.01 to 30% by weight of O in terms of elemental composition.

13. The composite material of claim 1 wherein the proportion of the inorganic fibers is 10 to 70% by volume.

* * * * *